(12) United States Patent  
Sadler

(10) Patent No.: US 9,144,230 B2  
(45) Date of Patent: Sep. 29, 2015

(54) HYDRODYNAMIC BODY FOR A FISHING LURE

(76) Inventor: Randy Sadler, Tofino (CA)

( * ) Notice: Subject to any disclaimer, the term of this patent is extended or adjusted under 35 U.S.C. 154(b) by 150 days.

(21) Appl. No.: 13/510,904

(22) PCT Filed: Nov. 24, 2010

(86) PCT No.: PCT/IB2010/055401  
§ 371 (c)(1),  
(2), (4) Date: May 18, 2012

(87) PCT Pub. No.: WO2011/064727  
PCT Pub. Date: Jun. 3, 2011

(65) Prior Publication Data  
US 2013/0031821 A1    Feb. 7, 2013

Related U.S. Application Data

(60) Provisional application No. 61/264,795, filed on Nov. 28, 2009.

(51) Int. Cl.  
*A01K 91/08*    (2006.01)

(52) U.S. Cl.  
CPC ..................................... *A01K 91/08* (2013.01)

(58) Field of Classification Search  
CPC ...................................................... A01K 91/08  
USPC ............. 43/43.13, 42.5, 42.51, 42.52, 42.03, 43/42.22, 42.23, 42.02; D22/126  
See application file for complete search history.

(56) References Cited

U.S. PATENT DOCUMENTS

| | | | | | |
|---|---|---|---|---|---|
| 1,264,626 A | * | 4/1918 | Foss | ............................... | 43/42.29 |
| 1,645,644 A | * | 10/1927 | Davenport | ..................... | 43/42.4 |
| 1,797,005 A | * | 3/1931 | Lillegraven | ................... | 43/42.23 |
| 1,861,110 A | * | 5/1932 | Campbell | ..................... | 43/42.34 |
| 1,875,122 A | * | 8/1932 | Olson | ........................... | 43/42.5 |
| 1,925,197 A | * | 9/1933 | Maynard | ...................... | 43/42.03 |
| 1,987,839 A | * | 1/1935 | Moilanen | ..................... | 43/42.04 |
| 2,235,868 A | * | 3/1941 | Coolidge et al. | ............. | 43/43.13 |
| 2,238,604 A | * | 4/1941 | Sabin | ........................... | 43/42.22 |
| 2,247,583 A | | 7/1941 | Louthan | | |
| 2,380,328 A | * | 7/1945 | Pecher | ........................ | 43/42.29 |
| 2,507,454 A | * | 5/1950 | Nelson | ........................ | 43/42.44 |
| 2,587,264 A | * | 2/1952 | Wood | ........................... | 43/42.33 |
| 2,597,317 A | * | 5/1952 | Gross | ........................... | 43/43.13 |
| 2,605,577 A | * | 8/1952 | Waugler | ...................... | 43/42.39 |
| 2,608,788 A | * | 9/1952 | Niemi | ........................... | 43/42.5 |
| 2,698,494 A | * | 1/1955 | Larsen | ......................... | 43/42.36 |
| D176,106 S | * | 11/1955 | Buck | ............................ | D22/129 |

(Continued)

OTHER PUBLICATIONS

International Search Report issued in corresponding PCT application mailing date Apr. 19, 2011.

*Primary Examiner* — Darren W Ark  
*Assistant Examiner* — Morgan T Barlow  
(74) *Attorney, Agent, or Firm* — Davis & Bujold, P.L.L.C.; Michael J. Bujold

(57) ABSTRACT

A hydrodynamic body for a fish lure rotates in the water causing the bait hook attached to the rear of the body to mimic the movements of a prey animal. The rotational motion is created by a combination of fins and wing design of the body. The body has a nose up configuration when the fish is not on the hook. When a fish takes the hook the drag caused by the fish causes the body to 'trip' from a nose up position to a horizontal position thereby tensioning the lure line so that the fish cannot escape the hook.

9 Claims, 2 Drawing Sheets

(56) References Cited

U.S. PATENT DOCUMENTS

| | | | | |
|---|---|---|---|---|
| 2,731,757 | A * | 1/1956 | Porth | 43/42.52 |
| 2,833,079 | A * | 5/1958 | Flaska | 43/42.34 |
| 2,849,826 | A * | 9/1958 | Kjormoe | 43/42.51 |
| 2,861,381 | A * | 11/1958 | Snyder | 43/42.36 |
| 2,886,914 | A * | 5/1959 | Lievense | 43/42.39 |
| 3,043,042 | A * | 7/1962 | Mutti | 43/42.51 |
| 3,059,372 | A * | 10/1962 | Hagel | 43/42.09 |
| 3,081,573 | A * | 3/1963 | Mutti | 43/42.24 |
| 3,135,065 | A | 6/1964 | Cromoga | |
| 3,165,854 | A * | 1/1965 | Teetor | 43/17.1 |
| 3,313,059 | A * | 4/1967 | Jures | 43/42.16 |
| 3,685,191 | A * | 8/1972 | Metzger | 43/42.05 |
| 3,762,088 | A * | 10/1973 | Bainton | 43/42.5 |
| 3,808,727 | A | 5/1974 | Flanders | |
| 4,110,930 | A * | 9/1978 | Daniels | 43/42.14 |
| 4,142,318 | A * | 3/1979 | Morrell | 43/42.43 |
| 5,020,267 | A * | 6/1991 | Rasmussen | 43/43.13 |
| 5,185,951 | A * | 2/1993 | Hemmerle | 43/43.13 |
| 5,970,648 | A * | 10/1999 | DeRose | 43/42.33 |
| 6,493,984 | B1 * | 12/2002 | Bechhold | 43/43.13 |
| 6,643,975 | B1 * | 11/2003 | Edwards | 43/42.31 |
| 7,197,846 | B1 * | 4/2007 | Gibson | 43/42.11 |
| 7,216,456 | B2 * | 5/2007 | Kaariainen et al. | 43/42.5 |
| 7,637,051 | B2 * | 12/2009 | Emory | 43/43.13 |
| 7,703,235 | B2 | 4/2010 | Ford | |
| 8,245,437 | B1 * | 8/2012 | Yelton | 43/42.5 |
| 2003/0097780 | A1 * | 5/2003 | Pentland | 43/42.5 |
| 2005/0028423 | A1 * | 2/2005 | Kaariainen et al. | 43/42.5 |
| 2005/0229474 | A1 * | 10/2005 | Braaten | 43/42.23 |
| 2005/0246940 | A1 * | 11/2005 | Jones et al. | 43/42.5 |
| 2008/0022580 | A1 * | 1/2008 | Moulder | 43/43.12 |
| 2008/0172925 | A1 | 7/2008 | Hazel | |

* cited by examiner

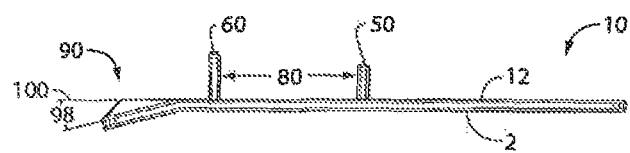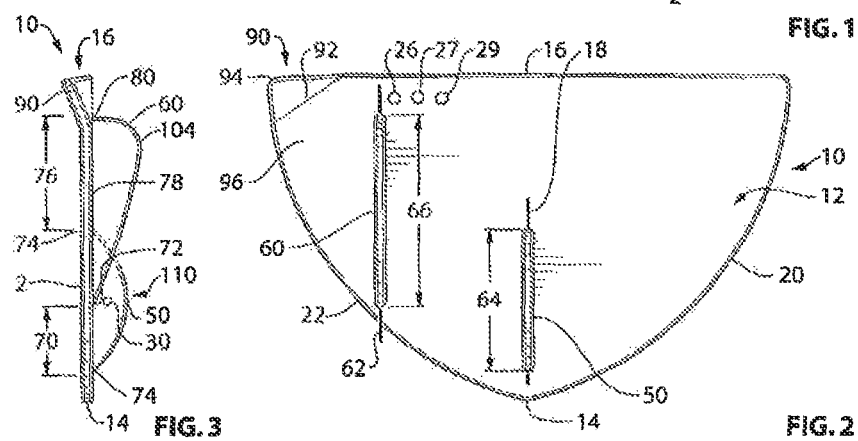

HYDRODYNAMIC BODY FOR A FISHING LURE

TECHNICAL FIELD

The invention is within the field of apparatus for fishing, trapping and vermin destroying. Specifically the invention is a hydrodynamic body for a fishing lure.

BACKGROUND ART

There are a variety of fishing lures which mimic prey animals by erratic movements. Spinners and dippers are two examples. Many of these devices are very complicated in design and manufacture and over-sized. For example, U.S. patent application Ser. No. 11/389,371 for an ADJUSTABLE TROLLING DEVICE by Emory discloses an adjustable apparatus having a guide fin that is rotatable through 360 degrees. The device has a plurality of parts held together by a screw. These parts can disassemble and be lost in water. The body to which the guide is attached may be 22 inches long. Another example is U.S. patent application Ser. No. 11/542,865 for a HYDRODYNAMIC FISHING DEVICE by Ford. It too discloses a body having a plurality of parts which must be adjusted by the user to determine the path of travel. Therefore, there is a continued need for a trolling fishing lure that has few or no moving parts, is small and compact and does not require adjustment on the part of the user to determine the path of the lure.

DISCLOSURE OF INVENTION

Technical Problem

To overcome the deficiencies noted above, my invention is a hydrodynamic body for imparting a rotational motion to a fishing lure moving through a water body. The hydrodynamic body comprising a base having a generally uniform thickness and a modified delta wing profile for movement through the water body, a first motion control fin, a second motion control fin, an angled wing tip on the modified delta wing profile for imparting a rotational movement to the hydrodynamic body and attachment means for a lure line and a leader line.

In one embodiment of the invention the hydrodynamic body has a base with a generally flat top surface and a generally flat bottom surface for reduced drag of the body as it moves through the water. The hydrodynamic body has a base centre line, a nose, a tail, a left hand curved side and a right hand curved side.

In one embodiment of the invention the first motion control fin depends from the flat bottom surface along the centre line and the second motion control fin depends from the flat bottom surface adjacent and parallel to the first motion control fin. The second motion control fin is disposed a predetermined distance from the first motion control fin so that the front end of the second motion control fin is disposed behind the front end of the first motion control fin.

In another embodiment of the invention the first motion control fin has a curved semi-circular bottom surface, a centre point and a height less than the height of the second motion control fin. The second motion control fin has a linear and inclined bottom surface and a vertical rear surface.

In a further embodiment of the invention, attachment means comprise a first attachment aperture disposed in the first motion control fin in the centre of the fin for releaseably receiving a first pivoting attachment swivel for connecting the leader line to the hydrodynamic body. Attachment means further comprises a second, third and fourth serially aligned attachment apertures disposed in front of the tail and between the first motion control fin and the second motion control fin. A preferred one of the second, third and fourth serially aligned apertures releaseably receives a second pivoting attachment swivel for connecting the lure line to the hydrodynamic body. The choice of the preferred one of the second, third and fourth apertures will determine the radius and the speed of the rotational movement of the hydrodynamic body about the leader line. If the lure line is attached to the outboard aperture then the rotation will be faster and wider. If the lure line is attached to the inboard aperture then the speed will be slower and the rotation more narrow.

In yet another embodiment of the invention the hydrodynamic body moves through the water in a dragging first nose-up configuration when a fish is not hooked so that the leader line and the lure line are not coplanar and the tension in the lure line is less than the tension in the leader line so that the lure line and an attached lure are able to move like a prey animal. The hydrodynamic body moves through the water in a non-dragging second horizontal configuration when a fish is hooked so that the lure line, leader line and hydrodynamic body are generally coplanar and so that the tension in the lure line is equal to the tension in the leader line so as to retain the fish on the hook.

Technical Solution

Advantageous Effects

The invention has the following advantages:
The hydrodynamic body has no moving parts.
It is simple to mould.
It provides for wide and quick rotation of the artificial bait for mimicking a live prey animal.
There is no drag on the fishing line when a fish is on the hook.
It is less than half the size of any other similar product on the market.
It will troll the surface of the water without the use of a down rigger.
It is adjustable to control the tightness of the rolling motion of the artificial bait.

DESCRIPTION OF DRAWINGS

FIG. 1 is a front view of one embodiment of the invention shown in an upside down position.

FIG. 2 is a bottom view of one embodiment of the invention.

FIG. 3 is a left side view of one embodiment of the invention.

FIG. 5 is a side view of one embodiment of the invention in a not-tripped position.

FIG. 6. is a side view of one embodiment of the invention in a tripped position.

BEST MODE

Figure 4:
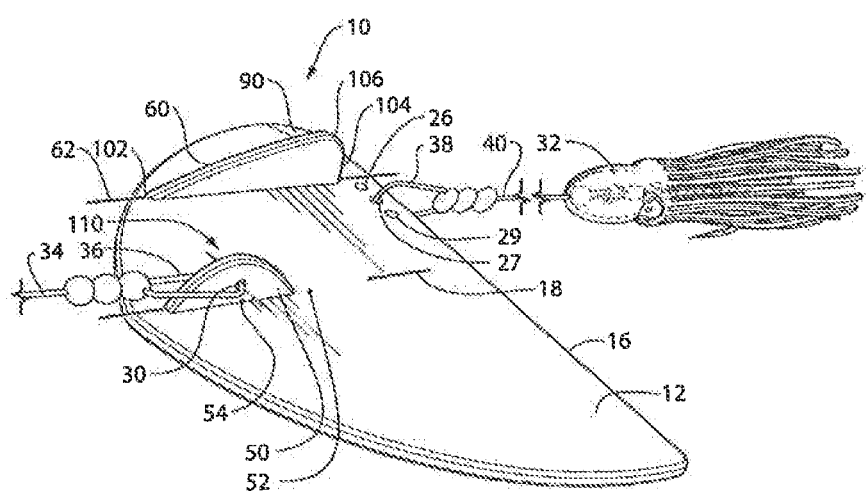
FIG. 4 is a perspective bottom view of one embodiment of the invention with a lure and leader line attached.

Referring to FIGS. 1, 2, 3 and 4 the invention is a hydrodynamic body 10 for a fishing lure 32. The embodiment shown in FIG. 1 is up-side down. The body has a generally flat base portion having a top surface 2 and a bottom surface 12, a nose 14, a tail 16, a centre-line 18, a curved right-side 20 and a curved left side 22. The body has a generally uniform thickness. The curved sides meet at the nose 14. Generally, the body 10 has the shape of a delta-wing wherein the artificial bait and hook 32 are attached at the tail 16 of the body 10 at one of apertures 26, 27 and 29. The leader line 34 to the fishing rod is attached at aperture 30. Line 34 is attached to a releaseable pivoting swivel attachment 36. The lure 32 is attached by a line 40 to one of the apertures 26, 27 or 29 by a second releaseable pivoting swivel attachment 38. The swivel attachments 36 and 38 are quick change attachments that permit the rapid removal and re-attachment of a leader line and bait hook.

FIGS. 1 to 4 show a first fin 50 which depends from surface 12 of the body 10 along the centre line 18. First fin 50 has a curved semi-circular shape. The centre 54 of the first fin 50 is disposed forward of the centre 52 of centre-line 18. Aperture 30 is disposed within the first fin 50 generally in the middle of the fin above at fin-centre 54 for attachment to the lead line 34. Swivel attachment 36 is allowed to pivot around aperture 30.

A second fin 60 depends from the bottom surface 12 having a longitudinal axis line 62 parallel to the centre line 18 so that fin 60 is parallel to fin 50. The shape of the second fin is somewhat different than the first as illustrated in FIG. 4. The shape of the second fin 60 is generally that of a bisected triangle having an apex at 102, a vertical base at 104 and a curved corner at 106. The curved corner 104 sits somewhat higher than the top 110 of the first fin 50. Second fin 60 is disposed slightly to the left of the apertures 26, 27 and 29. The length 64 of the first fin 50 is less than the length 66 of the second fin 60. As shown in FIG. 3, the front end 72 of the second fin 60 is disposed a distance 70 behind the front end 74 of the first fin 50. Similarly, the back end 80 of second fin 60 is disposed a distance 76 behind the back end 74 of the first fin 50. The first fin 50 and the second fin 60 are separated by a distance 80 as shown in FIG. 1.

Another innovative feature of the hydrodynamic body is wing tip 90 which is shown on the left hand side of the body 10. The wing tip forms a generally triangular section 92 having an apex 94 and a base 96. From base 96, the wing tip is bent upwards at a predetermined angle 98 from horizontal line 100 which represents an extension of the plane of the bottom surface 12.

The body is moulded from a suitable thermoplastic material as a single piece or unibody construction. It will be understood that the physical features of the body 10 can be arranged in a mirror image across centre line 18 so that fin 60, wing tip 92 and apertures 26, 27 and 29 would be disposed on the right hand side of the body.

When the hydrodynamic body is in the water and pulled by a boat the wing tip 90 and inclined surface area 92 cause the body to rotate in the water about the leader line 34. The first fin and the second fin act cooperatively to maintain the direction of body movement linear so that the drag caused by the lure will not move the body from to one side of the lead line to the other.

The three rear disposed apertures 26, 27 and 29 are used to control the speed and radius of rotation of the body and lure combination. Attachment of the lure to the outboard aperture 26 will increase the speed and the radius of rotation. Attachment of the lure to the inboard aperture 29 will decrease the speed and the radius of rotation.

When the body 10 is travelling through the water the body is in a nose 14 up configuration as illustrated in FIG. 5. When the fish 41 strikes the lure 32 the body is 'tripped', that is, the body will pivot from a nose up configuration to a flat configuration as shown in FIG. 6 thereby reducing drag on the body. The body will pivot around a point generally in the middle 52 of the centre line 18. This pivoting action virtually eliminates the drag caused by the body moving in the nose up configuration and permits tension to be transferred from the lead line 34 directly to the lure line 40 thereby maintaining the fish 41 on the hook until it can be captured.

The hydrodynamic body has a rear width of about 4 inches and a length of about 4 inches. The fins are about 1 inch high with the second fin being somewhat higher than the first fine. These dimensions may vary. The body is able to rotate at between 50 and 80 rpm. When a fish is on the hook the body will plane through the water without any drag. The body is about half the size of existing bodies and is a single moulded piece with no moving parts. The body is also capable of trolling on the surface of the water without a down rigger.

This description contains much specificity that should not be construed as limiting the scope of the invention but merely provides illustrations of some of its embodiments. Thus the scope of the invention should be determined by the appended claims and their legal equivalents rather than by the examples given.

The invention claimed is:

1. A hydrodynamic body for imparting rotational motion to a fishing moving through a water body, the hydrodynamic body comprising:
   a. a base having a flat top surface, flat bottom surface, a uniform thickness, and a center line; and the base having a nose, a tail, a left hand curved side and a right hand curved side that generally define a modified delta wing profile for drag reduced movement through the water body;
   b. a first motion control fin extending parallel to the center line;
   c. a second motion control fin being located adjacent to and parallel to the first motion control fin, the second motion control fin being disposed a predetermined distance laterally away from the center line and behind the first motion control fin such that a leading front end of the second motion control fin is disposed behind a leading front end of the first motion control fin, and the second motion control fin having a length which is longer than a length of the first motion control fin;
   d. the base being planar except for a portion of the tail and the left hand curved side which are inclined relative to the base and form a trailing wing tip which is configured for imparting rotation to the hydrodynamic body, about the center line, as the hydrodynamic body moves through the water body;
   e. the first motion control fin and the second motion control fin acting cooperatively with the wing tip so that the hydrodynamic body tracks in a straight line during the rotation of the hydrodynamic body as the hydrodynamic body moves through the water body;
   f. a first lure line attachment; and
   g. a leader line attachment for attachment of a leader line.

2. The hydrodynamic body of claim 1, wherein the first motion control fin projects from said flat bottom surface.

3. The hydrodynamic body of claim 2, wherein said second motion control fin projects from the flat bottom surface.

4. The hydrodynamic body of claim 3, wherein the first motion control fin has a curved semicircular bottom surface, a center point and a height less than a height of the second motion control fin.

5. The hydrodynamic body of claim 4, wherein the second motion control fin has a linear bottom surface and a vertical rear surface.

6. The hydrodynamic body of claim 5, wherein said leader line attachment comprises a first attachment aperture disposed in the first motion control fin above said center point, said first attachment aperture adapted for releasably receiving a first pivoting attachment swivel for connecting said leader line to the hydrodynamic body.

7. The hydrodynamic body of claim 6, wherein the first lure line attachment is located adjacent the tail at a position laterally displaced from the center line in the same direction that the second motion control fin is laterally displaced from the center line.

8. The hydrodynamic body of claim 7, further comprising a second lure line attachment and a third lure line attachment, the second and third lure line attachments each located adjacent the tail at a position laterally displaced from the center line in the same direction that the first lure line attachment is laterally displaced from the center line, with the amount of lateral displacement of each of the lure line attachments being different from the other lure line attachments, wherein in use, a lure line is attached to one of the lure line attachments and, as compared to the other lure line attachments, each of the lure line attachments provides a different radius and speed of said rotational movement of the hydrodynamic body about the leader line.

9. The hydrodynamic body of claim 1, wherein the wing tip is generally triangular and is bent upwards so that the wing tip is angled away from the generally flat bottom surface.

* * * * *